Re. 24430
June 26, 1956  L. HORNBOSTEL  2,752,045
PERFORATED DRUM TYPE LIQUID FILTER
Filed July 28, 1953  2 Sheets-Sheet 1
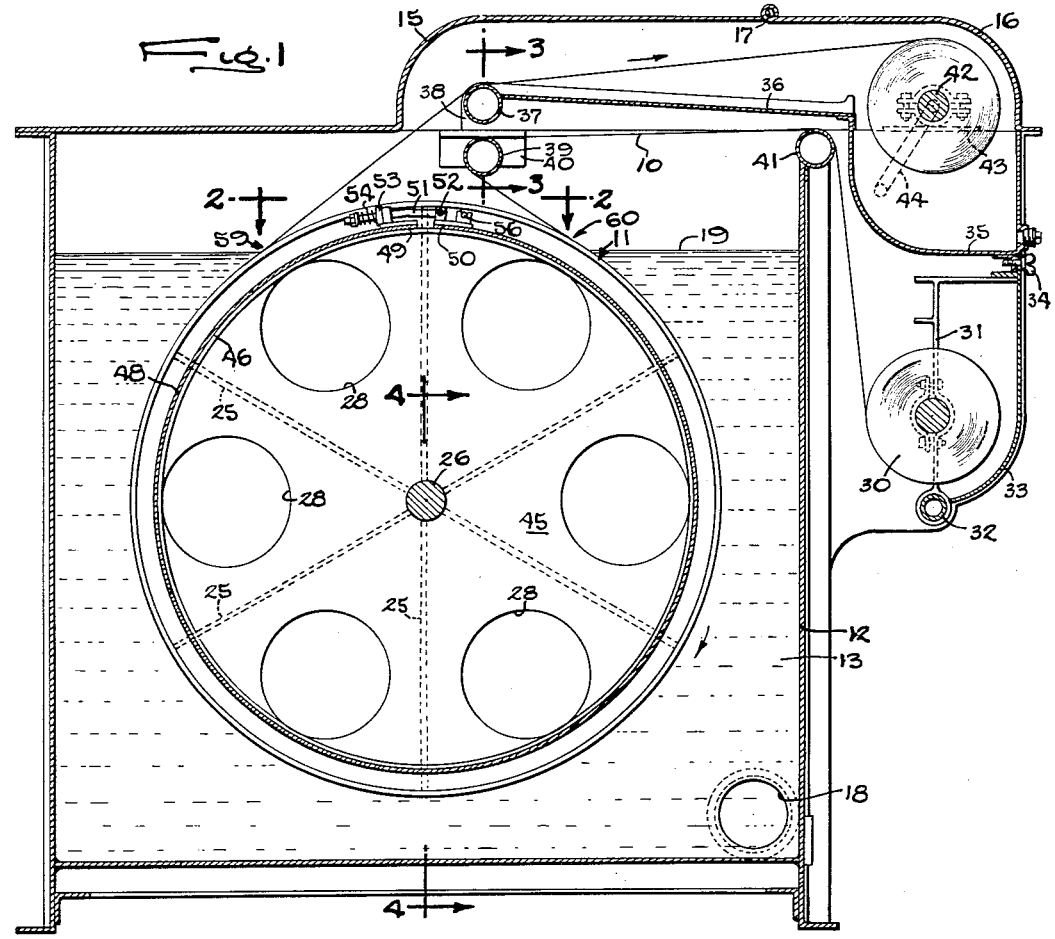
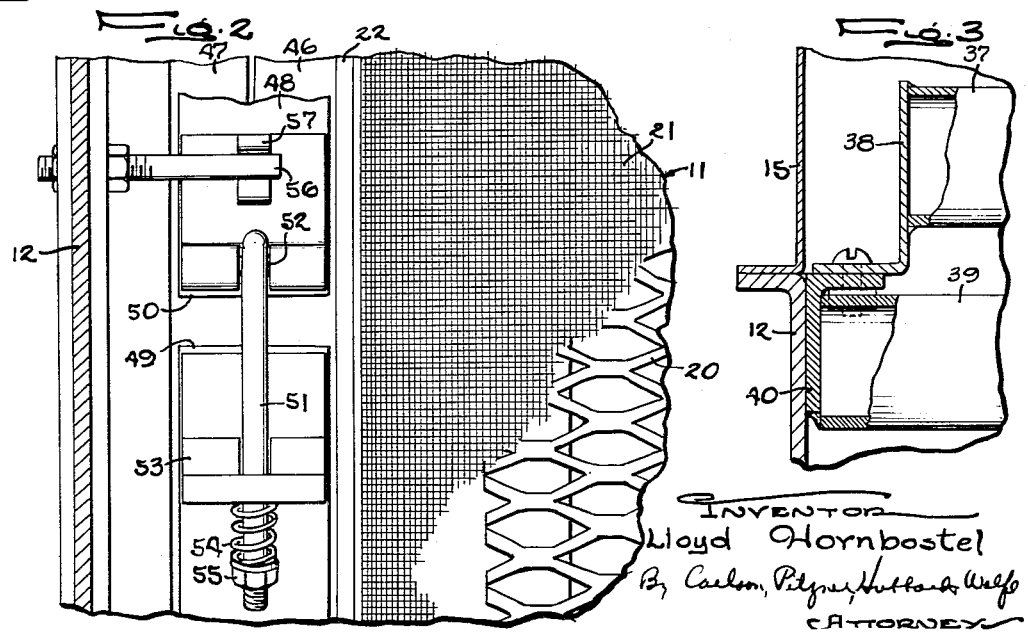
INVENTOR
Lloyd Hornbostel
By Carlson, Pitzner, Hubbard Wolfe
ATTORNEY June 26, 1956 L. HORNBOSTEL 2,752,045
PERFORATED DRUM TYPE LIQUID FILTER
Filed July 28, 1953 2 Sheets-Sheet 2
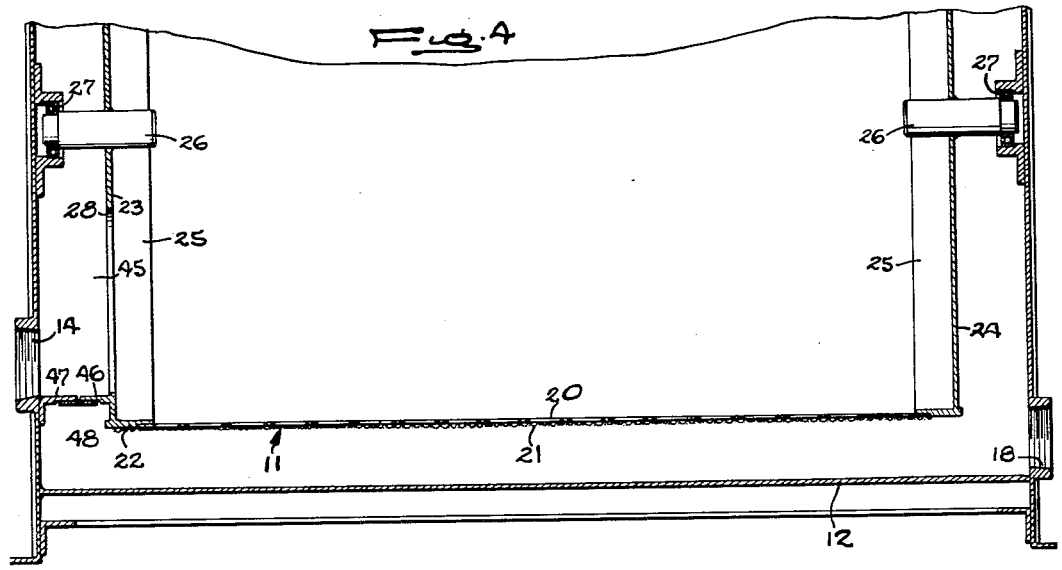
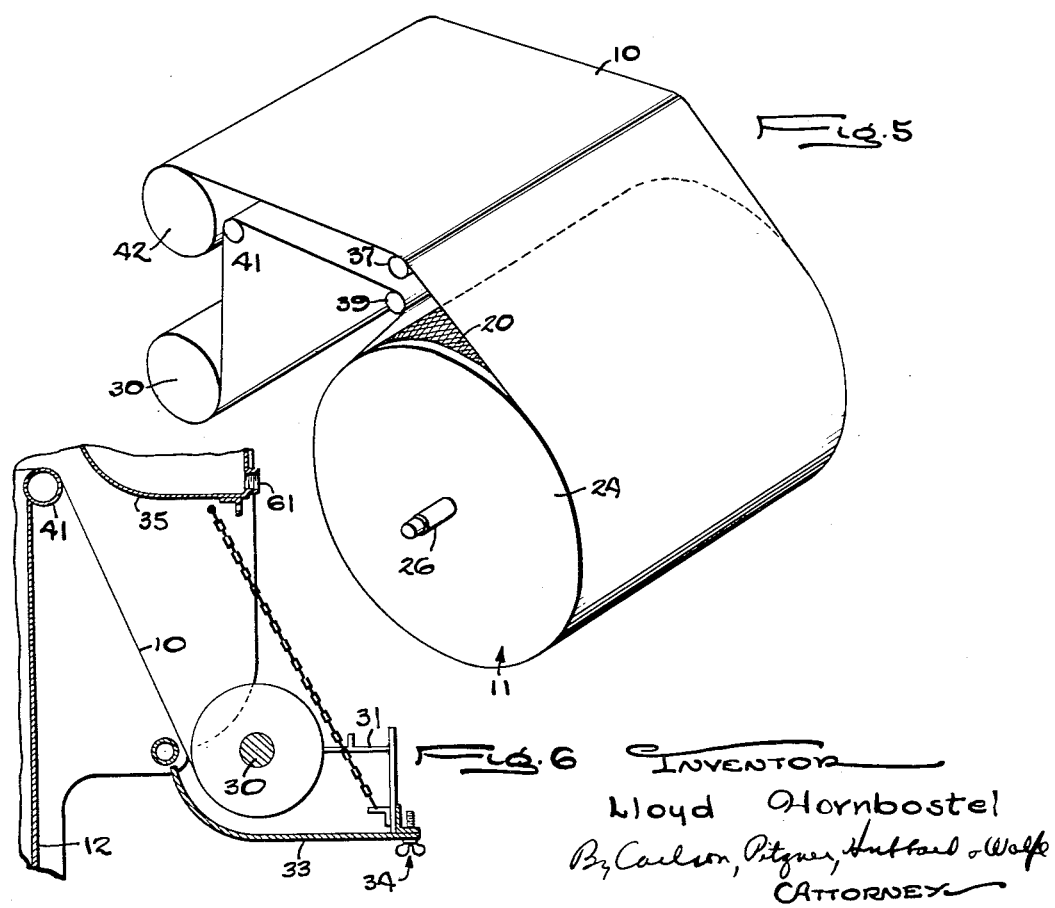
INVENTOR
Lloyd Hornbostel

2,752,045

PERFORATED DRUM TYPE LIQUID FILTER

Lloyd Hornbostel, Beloit, Wis., assignor of one-half to Rogers Hornbostel and one-half to Lloyd Hornbostel, Jr., both of Beloit, Wis.

Application July 28, 1953, Serial No. 370,737

3 Claims. (Cl. 210—199)

This invention relates to liquid filters of the type in which a flexible filter sheet travels around a rotary perforated drum partially submerged in the liquid to be filtered, the filtrate being removed through the interior of the drum.

The general object is to provide a filter of the above character which is simple and efficient and relatively inexpensive in construction for a given filtering capacity, which operates solely by gravitational flow, and which provides for automatic by-passing of the liquid to the filter outlet in the event that the filter sheet becomes clogged or overloaded.

Another object is to combine the filtrate outlet and the drum seal in a novel manner to provide substantially complete draining of the drum and full utilization of the gravity head in inducing the filtering action.

A further object is to lead the filter sheet to and from the drum in a novel manner to provide vertical over-all compactness of the unit and prevent the filtered material from falling therefrom.

Still another object is to provide, in the event of clogging of the filter sheet, for by-passing of the supplied liquid through an uncovered part of the drum.

The invention also resides in the novel mounting of the filter sheet supply roll to permit ready replacement thereof.

Other objects and advantages of the invention will become apparent from the followin detailed description taken in connection with the accompanying drawings, in which:

Figure 1 is a vertical sectional view of a filter embodying the novel features of the present invention.

Figs. 2, 3, and 4 are fragmentary sectional views taken respectively along the lines 2—2, 3—3, and 4—4 of Fig. 1.

Fig. 5 is a perspective schematic view of the filtering elements.

Fig. 6 is a fragmentary sectional view of a part of Fig. 1 showing the filter medium supply roll in a different position.

The improved filter shown in the drawings for purposes of illustration comprises generally an elongated flexible filter sheet 10 extending partially around a perforated drum 11 rotatably mounted within a tank 12 containing the liquid 13 to be filtered by gravitation through the sheet 10 into the interior of the drum from which the filtrate is drained through an outlet 14 (Fig. 4). The tank is of generally square box-like construction somewhat deeper than the diameter of the drum and preferably is closed by a suitable cover the major part 15 of which is rigid with the upper flanged edge of the tank wall. Herein, a second part 16 of the cover is hinged at 17 to the part 15 and projects outwardly and around one side of the tank as shown in Fig. 1. The fluid 13 to be filtered is delivered into the tank through an inlet 18 and the rate of flow is suitably controlled so as to maintain the liquid at a normal level 19 near the top of the tank.

Herein, the drum 11 comprises a rigid perforated cylinder 20 covered by a suitable screen 21 with its opposite ends seated in the cylindrical rims 22 on two circular disks 23 and 24. The latter, which constitute ends of the drum, are joined to spokes 25 and rigid with trunnions 26 which project axially and outwardly and are journaled in bearings 27 supported in opposite side walls of the tank. The drum is thus adapted to turn about a horizontal axis so disposed that with the liquid at the level 19 all except a small segment at the top of the drum is submerged.

The disk 24 is solid so as to close one end of the drum. The other end is left open as by forming holes 28 at spaced points around the outer edge portion of the disk 23.

The filter medium 10 which may be composed of woven fabric or other porous material is wide enough to cover the full perforated length of the drum and is an elongated sheet wound around a supply roll 30. The latter is preferably disposed outside of the tank and has end trunnions which herein are supported by a bracket 31 pivoted at 32. The bracket is rigid with a cover 33 whose free edge is adapted to be secured detachably at 34 to a plate 35 which is rigid with the tank and cooperates with the movable part 16 of the cover to form a housing enclosing the supply roll. When the cover 33 is released and swung outwardly and downwardly as shown in Fig. 6, the supply roll is exposed thus affording convenient access for the substitution of a new supply sheet.

The plate 35 overhangs the upper edge of the tank side wall and constitutes an extension of a drain plate 36 which spans opposite sides of the cover part 15 and slopes inwardly and upwardly to a cylindrical rod 37 which is longer than the width of the sheet 10 and, in this instance, is secured as by welding (see Fig. 3) to brackets 38 mounted at the upper edge of the tank.

A similar rod 39 is secured at opposite ends to brackets 40 on the tank and disposed a short distance below the rod 37. The rod 39 is disposed at substantially the same level as a similar rod 41 welded to the tank edge adjacent the supply roll 30.

The filter sheet wound around the supply roll is led off from the inner side of the latter and extended upwardly around the guide rod 41, then horizontally across the tank and around the guide rod 39. From the latter, the sheet is bent reversely and downwardly around the perforated area of the drum 11. Near the lever 19, the sheet leaves the liquid and slants upwardly around the guide rod 37 beyond which the sheet slopes gradually upwardly and outwardly to a take up roll 42 journaled in bearings which are supported on a bar 43 spanning the side walls of a casing defined by the plate 35 and the cover part 16. The take up roll may be turned by a hand crank 44 or if desired by suitable power actuated mechanism to advance the sheet 10 at the proper rate. During such turning of the take up roll and advance of the sheet, the drum 11 is turned to draw fresh cloth off from the supply roll 30. In such advance, a loaded part of the sheet is raised out of the liquid toward the guide rod 37 while a corresponding length of clean cloth is immersed in the liquid on the opposite side of the drum. By adjusting the rate of advance of the sheet 10 in accordance with the character of the liquid to be filtered and other factors, the level of the liquid 13 may be maintained substantially constant for a given rate of delivery of the liquid into the inlet 18.

When the drum constructed and mounted as above described is submerged in the liquid, the latter will flow through the filter cloth and screen into the interior of the drum where the filtrate accumulates. In accordance with the present invention, provision is made for withdrawing the filtrate from the drum in a novel manner such as to utilize substantially the entire peripheral area of the drum in achieving efficient filtering and also to maintain a maximum rate of flow of the liquid through the filtering medium. This is accomplished by a novel location of the outlet 14 combined with the provision of an enclosure of novel construction around one end of the drum 11 so that the latter is fully drained or nearly so in all of its different angular positions.

To these ends, the outlet 14 through which the filtrate is withdrawn from the tank 12 is disposed at a level close to the bottom of the drum 11. On the interior of the tank, the outlet and the interior of the drum are enclosed by a chamber 45 which is of circular shape and a diameter substantially equal to the diameter of the drum so as to communicate with the interior of the drum in all angular positions of the latter. The chamber 45 is defined in part by an annular imperforate flange 46 concentric with the drum axis and projecting from the drum end 23 outside of the openings 28 therethrough.

Axially alined with and of the same size as the flange 46 is an annular imperforate frame 47 which preferably is rigid with a wall of the tank and projects from the latter substantially into abutment with the flange 46. The gap between the rotatable and stationary flanges is closed by a sealing band 48 extending around the exterior of and overlapping the adjacent ends of the flanges. The band may be a strip of flexible material with opposite ends 49 and 50 disposed and held above the normal level 19 of the liquid 13 and drawn together to contract the band to maintain the desired sealing pressure. Herein, contraction of the band is effected by a screw 51 pivotally connected at 52 to the band end 50 with its other end projecting through an outstanding lug 53 on the band end 49. Beyond the lug, a spring 54 is coiled around the screw 51 and compressed by tightening a nut 55. The tensioning device thus formed is held against turning with the drum 11 by a pin 56 anchored in the tank wall and projecting into a lug 57 on the band end 50. As a result, the submerged part of the chamber 45 is sealed effectually against the entry of the unfiltered liquid 13 in all positions of the drum during its slow rotation.

In operation of the filter, the liquid to be filtered is delivered to the tank at a rate correlated with the filtering capacity of the submerged part of the filtering medium 10 so as to maintain the tank filled substantially to the level 19. At the same time, the take up roll 42 is turned continuously or intermittently to wind up the used part of the filter medium and to turn the drum in the direction indicated by the arrow in Fig. 1 thereby drawing a corresponding amount of the clean sheet off from the supply roll 30. Since the lowermost part of the drum interior is drained continuously through the chamber 45 and the outlet 14, the substantial head of the unfiltered liquid operates by gravity to force the liquid through the cloth over substantially the entire submerged area thereof. The filtering action thus proceeds continuously and entirely by gravity thus contributing to the over-all simplicity of the filter construction irrespective of the capacity of the filter.

With the guides 37 and 39 disposed above the top of the drum as described above, it will be observed that the dirty and clean parts of the filter cloth are led onto and off the drum periphery at points 59 and 60 disposed above the normal level 19 of the liquid 13. Since these points are spaced apart angularly around the drum, the intervening arc of the perforated periphery of the drum is left uncovered and adapted for the free passage of the unfiltered liquid directly into the drum. Such by-passing of the liquid will occur automatically in the event that the liquid 13 rises substantially above the latter if the filter becomes clogged or the unfiltered liquid is supplied at too rapid a rate. Any danger of overflowing the tank or interrupting the flow of fluid through the filtering system is thus avoided.

It will be observed that the used portion of the filter sheet is led off from the drum at a comparatively small angle relative to the horizontal and, after passing around the guide 37, extends generally horizontally to the take up roll 42. With this arrangement, the excess liquid dropping from the filter sheet falls onto the drain plate 36 and flows down the plate 35 to a drain outlet 61. Any possibility of the filtered material falling back into the liquid body 13 is thus avoided.

I claim as my invention:

1. A filter having in combination, a tank adapted to contain a body of liquid to be filtered, a drum having a perforated periphery mounted within said tank to turn about a horizontal axis coincident with the drum axis, parallel vertically spaced supply and take up rolls disposed outwardly beyond the side wall of said tank and mounted to turn about axes paralleling the drum axis, a pair of guides paralleling the drum axis and mounted above said drum, a flexible filter sheet encircling said supply roll and extending generally horizontally across the top of said tank, around one of said guides, then downwardly around the drum to cover the perforated area thereof, upwardly and around the other of said guides and finally generally horizontally to said take up roll, a member disposed beneath the horizontal run of said sheet to prevent material falling from the sheet from returning to said tank, and means for draining filtrate from the interior of the drum.

2. A filter having in combination, a tank adapted to contain a body of liquid to be filtered, a drum having a perforated periphery mounted within said tank to turn about a horizontal axis coincident with the drum axis, parallel supply and take up rolls disposed outwardly beyond the side wall of said tank and mounted to turn about horizontal axes paralleling the drum axis and disposed at different levels, a flexible filter sheet encircling said supply roll and extending across the top of said tank, downwardly around the drum to cover the perforated area thereof, and finally to said take up roll, means for guiding the portions of said sheet between said drum and said supply and take up rolls, and means for draining filtrate from the interior of the drum.

3. A filter having in combination, a tank adapted to contain a body of liquid to be filtered, a drum having a perforated periphery mounted within said tank to turn about a horizontal axis coincident with the drum axis, parallel vertically spaced supply and take up rolls disposed outwardly beyond the side wall of said tank and mounted to turn about axes paralleling the drum axis, a flexible filter sheet encircling said supply roll and extending across the top of said tank, downwardly around the drum to cover the perforated area thereof, upwardly and around said take up roll, means for draining filtrate from the interior of the drum, a bracket rotatably supporting said supply roll, and means pivotally supporting said bracket to swing toward and away from the wall of said tank between an inner operating position and an outer loading position.

References Cited in the file of this patent
UNITED STATES PATENTS

| Number | Name | Date |
|---|---|---|
| 550,353 | Parker | Nov. 26, 1895 |
| 794,631 | Milne | July 11, 1905 |
| 953,744 | Gaara | Apr. 5, 1910 |
| 993,839 | Keyes | May 30, 1911 |
| 1,103,725 | Wood | July 14, 1914 |
| 1,797,248 | Szeguari | Mar. 24, 1931 |

FOREIGN PATENTS

| Number | Country | Date |
|---|---|---|
| 22,852 | Great Britain | 1901 |
| 16,779 | Great Britain | 1901 |